US012609302B2

(12) United States Patent
Park et al.

(10) Patent No.: US 12,609,302 B2
(45) Date of Patent: Apr. 21, 2026

(54) NEGATIVE ELECTRODE AND RECHARGEABLE LITHIUM BATTERY INCLUDING THE SAME

(71) Applicant: SAMSUNG SDI CO., LTD., Yongin-si (KR)

(72) Inventors: Sunil Park, Yongin-si (KR); Changsu Shin, Yongin-si (KR); Young-Min Kim, Yongin-si (KR); Eunji Kang, Yongin-si (KR); Doori Oh, Yongin-si (KR); Jongmin Won, Yongin-si (KR); Yookyung Kim, Yongin-si (KR); Youngugk Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 231 days.

(21) Appl. No.: 18/383,647

(22) Filed: Oct. 25, 2023

(65) Prior Publication Data

US 2024/0347703 A1 Oct. 17, 2024

(30) Foreign Application Priority Data

Apr. 17, 2023 (KR) ........................ 10-2023-0050153

(51) Int. Cl.

| | |
|---|---|
| ***H01M 4/36*** | (2006.01) |
| ***C01B 32/158*** | (2017.01) |
| ***C01B 32/159*** | (2017.01) |
| ***H01M 4/02*** | (2006.01) |
| ***H01M 4/133*** | (2010.01) |
| ***H01M 4/134*** | (2010.01) |

(Continued)

(52) U.S. Cl.

CPC ........... *H01M 4/366* (2013.01); *C01B 32/158* (2017.08); *C01B 32/159* (2017.08); *H01M 4/133* (2013.01); *H01M 4/134* (2013.01); *H01M 4/386* (2013.01); *H01M 4/587* (2013.01); *H01M 10/052* (2013.01); *C01B 2202/02* (2013.01); *C01B 2202/06* (2013.01); *C01B 2202/22* (2013.01); *C01P 2006/40* (2013.01); *H01M 2004/027* (2013.01)

(58) Field of Classification Search

CPC ...................................................... H01M 4/366

See application file for complete search history.

(56) References Cited

U.S. PATENT DOCUMENTS

| | | | |
|---|---|---|---|
| 2019/0233294 | A1 | 8/2019 | Moon et al. |
| 2021/0167369 | A1 | 6/2021 | Park et al. |

(Continued)

FOREIGN PATENT DOCUMENTS

| | | | | | |
|---|---|---|---|---|---|
| CN | 109309220 A | * | 2/2019 | | ............. B82Y 30/00 |
| CN | 109686952 A | * | 4/2019 | | ........ H01M 10/0525 |

(Continued)

OTHER PUBLICATIONS

Korean Office action dated Jul. 28, 2025.

*Primary Examiner* — Brian R Ohara
(74) *Attorney, Agent, or Firm* — Lee IP Law, P.C.

(57) ABSTRACT

A negative active material and a rechargeable lithium battery including the negative active material, the negative active material includes a silicon-carbon composite including nano-silicon and amorphous carbon; an N-doped carbon layer on the silicon-carbon composite; and a coating layer on the N-doped carbon layer, the coating layer including carbon nanotubes.

12 Claims, 2 Drawing Sheets

(51) Int. Cl.

| | |
|---|---|
| ***H01M 4/38*** | (2006.01) |
| ***H01M 4/587*** | (2010.01) |
| ***H01M 10/052*** | (2010.01) |

(56) References Cited

U.S. PATENT DOCUMENTS

| | | | | |
|---|---|---|---|---|
| 2021/0399304 | A1* | 12/2021 | Lee | H01M 4/587 |
| 2024/0055586 | A1* | 2/2024 | You | H01M 4/583 |

FOREIGN PATENT DOCUMENTS

| | | | | | |
|---|---|---|---|---|---|
| CN | 112271286 | A | * | 1/2021 | B82Y 40/00 |
| CN | 113066970 | A | * | 7/2021 | H01M 10/0525 |
| CN | 114520314 | A | * | 5/2022 | H01M 10/0525 |
| KR | 10-2014-0107926 | A | | 9/2014 | |
| KR | 10-2019-0091411 | A | | 8/2019 | |
| KR | 10-2050835 | B1 | | 12/2019 | |
| KR | 10-2020-0022729 | A | | 3/2020 | |
| KR | 10-2020-0023241 | A | | 3/2020 | |
| KR | 2020023241 | A | * | 3/2020 | C01B 32/05 |
| KR | 10-2021-0156918 | A | | 12/2021 | |
| WO | WO-2021195913 | A1 | * | 10/2021 | H01M 10/0525 |

* cited by examiner

NEGATIVE ELECTRODE AND RECHARGEABLE LITHIUM BATTERY INCLUDING THE SAME

CROSS-REFERENCE TO RELATED APPLICATION

This application claims priority to and the benefit of Korean Patent Application No. 10-2023-0050153 filed in the Korean Intellectual Property Office on Apr. 17, 2023, the entire contents of which are incorporated herein by reference.

BACKGROUND

1. Field

Embodiments relate to a negative active material and a rechargeable lithium battery including the same.

2. Description of the Related Art

Recently, with a rapid spread of electronic devices such as mobile phones, laptop computers, electric vehicles, and the like, a demand for small, lightweight, and relatively high-capacity rechargeable lithium batteries are rapidly increasing.

SUMMARY

The embodiments may be realized by providing a negative active material including a silicon-carbon composite including nano-silicon and amorphous carbon; an N-doped carbon layer on the silicon-carbon composite; and a coating layer on the N-doped carbon layer, the coating layer including carbon nanotubes.

The carbon nanotubes may include single-walled carbon nanotubes, multi-walled carbon nanotubes, or a combination thereof.

The carbon nanotubes are single-walled carbon nanotubes.

The N-doped carbon layer may have a sponge structure.

The N-doped carbon layer may have a sheet shape.

The silicon-carbon composite may further include crystalline carbon.

The N-doped carbon layer may be included in an amount of about 1 wt % to about 7 wt %, based on a total weight of the negative active material.

The carbon nanotubes may be included in an amount of about 0.01 wt % to about 0.15 wt %, based on a total weight of the negative active material.

The N-doped carbon layer may be prepared from urea, melamine, thiourea, ethylenediamine, or a combination thereof.

The N-doped carbon layer may have a thickness of about 100 nm to about 500 nm.

The coating layer including the carbon nanotubes may have a thickness of about 100 nm to about 500 nm.

The embodiments may be realized by providing a rechargeable lithium battery including a negative electrode including a negative active material according to an embodiment; a positive electrode; and an electrolyte.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
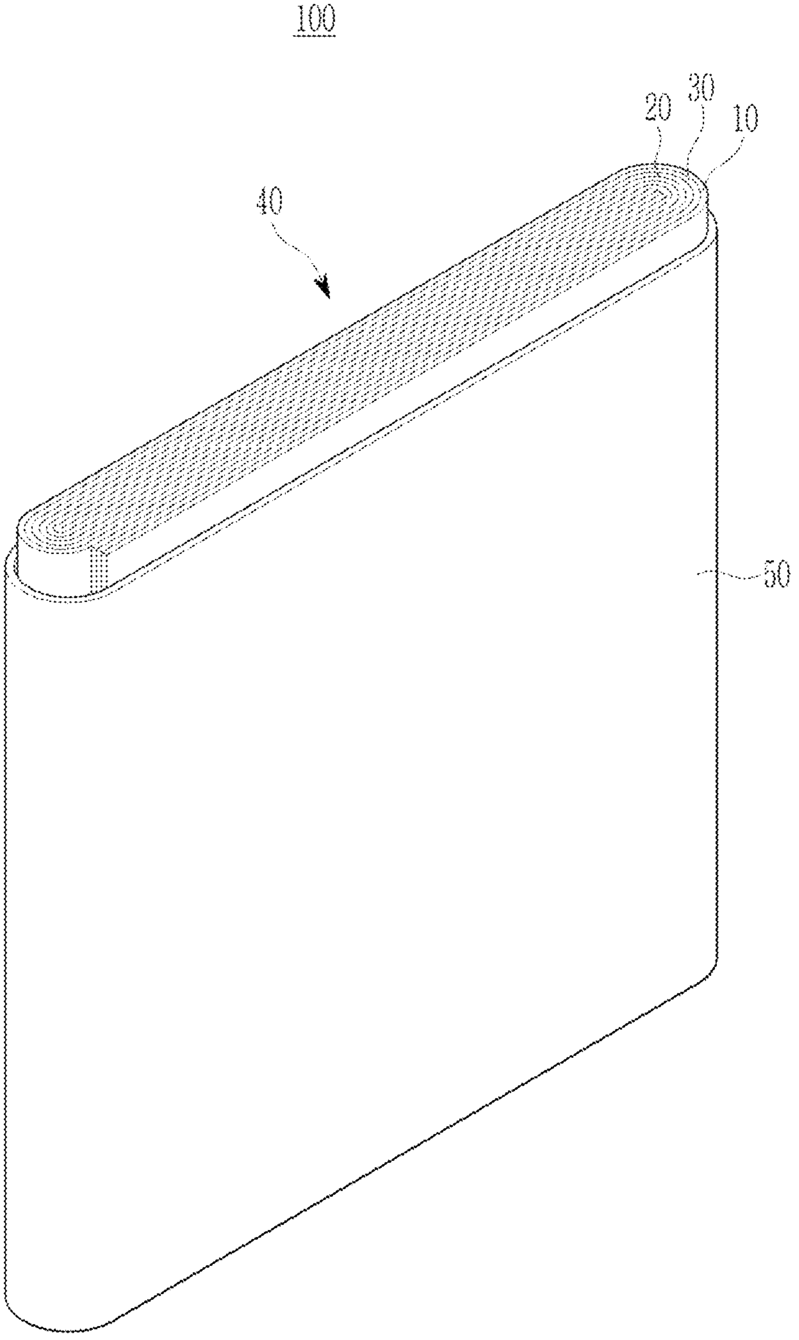
FIG. 1 is a schematic view of a rechargeable lithium battery according to some example embodiments.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In addition, it will also be understood that when a layer is referred to as being "between" two layers, it can be the only layer between the two layers, or one or more intervening layers may also be present. Like reference numerals refer to like elements throughout.

The terminology used herein is used to describe embodiments only, and is not intended to limit the present disclosure. The singular expression includes the plural expression unless the context clearly dictates otherwise.

As used herein, "a combination thereof" refers to a mixture, a laminate, a composite, a copolymer, an alloy, a blend, a reaction product, and the like of constituents.

Herein, it should be understood that terms such as "comprises," "includes," or "have" are intended to designate the presence of an embodied feature, number, step, element, or a combination thereof, but it does not preclude the possibility of the presence or addition of one or more other features, number, step, element, or a combination thereof.

In the drawings, the thickness of layers, films, panels, regions, etc., are exaggerated for clarity and like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, "layer" herein includes not only a shape formed on the whole surface when viewed from a plan view, but also a shape formed on a partial surface.

Herein, "or" is not to be construed as an exclusive meaning, e.g., "A or B" is construed to include A, B, A+B, and the like.

As used herein, when a definition is not otherwise provided, a particle diameter or size may be an average particle diameter. This average particle diameter means the average particle diameter (D50), which means a diameter (D50) of particles having a cumulative volume of 50 volume % in a particle size distribution. The average particle diameter may be measured by a suitable method, e.g., may be measured by a particle size analyzer, or may be measured by a transmission electron microscopic photograph or a scanning electron microscopic photograph. Alternatively, it is possible to obtain an average particle diameter value by measuring it using a dynamic light-scattering method, performing data analysis, counting the number of particles for each particle size range, and calculating from this.

A negative active material according to some example embodiments may include a silicon-carbon composite including nano-silicon and amorphous carbon; an N-doped carbon layer on the silicon-carbon composite; and a coating layer on the carbon layer and including carbon nanotubes.

The negative active material may include an N-doped carbon layer, and it may exhibit improved electrical conductivity. The N-doped carbon layer according to some example embodiments may be composed of only nitrogen and carbon, and when measured by XRD diffraction using CuKα rays, the (002) peak may appear sharp similar to graphite, and thus the conductivity may be improved.

In an implementation, the N-doped carbon layer may have a sponge structure. The sponge structure may mean that a plurality of (e.g., interconnected) pores are formed therein. In the N-doped carbon layer having a sponge structure, the silicon-carbon composite and the N-doped carbon layer, e.g., silicon and the N-doped carbon layer, may make surface contact, thereby further reducing contact resistance.

The N-doped carbon layer may have a sheet shape. In the carbon layer having a sheet shape, the contact resistance may be further reduced, thereby preventing a rapid decrease in cycle-life more effectively.

Such a sponge-structured N-doped carbon layer, e.g., a sheet-shaped sponge-like N-doped carbon layer, may be obtained by using an N-containing compound of, e.g., urea, melamine, thiourea, ethylenediamine, or a combination thereof, as a starting material.

In an implementation, the N-doped carbon layer may be formed by mixing a silicon-carbon composite and an N-containing compound and performing heat treatment. The heat treatment process may be carried out at about 650° C. or lower, e.g., at about 550° C. to about 650° C. The heat treatment process may be performed under a gas atmosphere of, e.g., $N_2$, argon, or a combination thereof.

The N-containing compound may be decomposed according to the heat treatment process, and a sponge-structured N-doped carbon layer may be formed on the silicon-carbon composite.

If the heat treatment process were to be performed at greater than about 650° C., N-doping could occur to the silicon-carbon composite, because the carbon may be completely removed from the N-containing compound, and the N-doped carbon layer may not be formed.

In an implementation, the negative active material may include a coating layer including carbon nanotubes, and the negative active material may maintain good contact among the active material particles. If the active material of some example embodiments as a first active material is used with crystalline carbon as a second active material, this active material may maintain a good electrical contact with the second active material.

Even if the silicon in the silicon-carbon composite were to greatly expand in volume during the charge and discharge, the negative active material according to some example embodiments deterioration of the contact between the active material particles or deterioration of contact with the crystalline carbon second active material may be prevented. The effect of improving the contact among the active material particles by including the carbon nanotube may be achieved, e.g., by forming the coating layer including the carbon nanotubes on the surface of the negative active material. If the carbon nanotubes were to be mixed with a core of a negative active material, in the silicon-carbon composite according to some example embodiments, the carbon nanotubes could be in a state of being coated with the N-doped carbon layer, losing the contact among the active material particles or the contact with the crystalline carbon second active material.

The carbon nanotubes may be, e.g., single-walled carbon nanotubes, multi-walled carbon nanotubes, or a combination thereof. In an implementation, the may be single-walled carbon nanotubes.

In an implementation, an amount of the N-doped carbon layer may be about 1 wt % to about 7 wt %, e.g., about 1 wt % to about 5 wt %, or about 1 wt % to about 3 wt % based on a total weight of the negative active material layer.

If the amount of the N-doped carbon layer is within the above ranges, the effect of increasing conductivity may be further increased.

An amount of the carbon nanotubes may be about 0.01 wt % to about 0.15 wt %, e.g., about 0.01 wt % to about 0.1 wt %, or about 0.01 wt % to about 0.05 wt %, based on the total weight of the negative active material layer.

If the amount of the carbon nanotubes is within the ranges, the electrical contact with adjacent active material particles or with the crystalline carbon second negative active material may be further improved, further increasing electrical conductivity.

In an implementation, the N-doped carbon layer may have a thickness of about 100 nm to about 500 nm or about 100 nm to about 400 nm. If the N-doped carbon layer has a thickness within the ranges, more appropriate electrical conductivity may be achieved.

The coating layer including the carbon nanotubes may have a thickness of about 100 nm to about 500 nm. If the coating layer including the carbon nanotubes has a thickness within the range, more appropriate electrical conductivity may be achieved. If the coating layer including the carbon nanotubes has a thickness within the range, a connection network among the negative active materials may be better maintained during the charge and discharge. In an implementation, if the negative active material is mixed with the crystalline carbon-based negative active material, a connection network between the negative active material and the crystalline carbon-based negative active material may be better maintained.

In the silicon-carbon composite, a particle diameter of the nano-silicon may be about 10 nm to about 1,000 nm, e.g., about 20 nm to about 150 nm. If the particle diameter of the nano-silicon is included in the above ranges, excessive volume expansion (that could otherwise occur during charging and discharging) may be suppressed, and disconnection of a conductive path due to particle crushing during charging and discharging may be prevented.

In the silicon-carbon composite, the amorphous carbon may be soft carbon or hard carbon, a mesophase pitch carbonized product, calcined coke, or a combination thereof.

In an implementation, the silicon-carbon composite may include nano-silicon and amorphous carbon coated on the surface of the nano-silicon. In an implementation, the silicon-carbon composite may include secondary particles in which primary nano-silicon particles are agglomerated, and an amorphous carbon coating layer on the surface of the secondary particles. The amorphous carbon may also be disposed between the primary nano-silicon particles, so that, e.g., the primary nano-silicon particles may be coated with amorphous carbon. The silicon-carbon composite may include a core in which nano-silicon is dispersed in an amorphous carbon matrix and an amorphous carbon coating layer coating the surface of the core.

The secondary particles may be in the center of the Si—C composite, which may be referred to as the core and a center portion. The amorphous carbon coating layer may be referred to as a shell or an outer portion.

A mixing (e.g., weight) ratio of nano-silicon and amorphous carbon may be about 1:99 to about 60:40.

In an implementation, the secondary particle or the core may further include crystalline carbon. The crystalline carbon may include graphite such as unspecified-shaped, sheet-shaped, flake, spherical, or fibrous natural graphite or artificial graphite.

In an implementation, the amorphous carbon may be coated, and a thickness of the coating layer of the amorphous carbon may be about 5 nm to about 100 nm.

The negative active material according to some example embodiments may be usefully used in a rechargeable lithium battery.

The negative active material according to some example embodiments may be prepared through the following process.

The silicon-carbon composite may be mixed with an N-containing compound, and this mixture may be heat-treated. A mixing ratio of the silicon-carbon composite with the N-containing compound may be adjusted to include about 1 wt % to about 5 wt % of the N-doped carbon layer based on the total weight of the negative active material layer.

The N-containing compound may include, e.g., urea, melamine, thiourea, ethylenediamine, or a combination thereof. In an implementation, the compound may include melamine.

The heat treatment process may be performed at about 650° C. or less, e.g., about 550° C. to about 650° C. The heat treatment process may be performed under an $N_2$ gas atmosphere.

A product obtained therefrom and carbon nanotubes may be mixed in a solvent and dried, preparing a negative active material.

The solvent may include, e.g., water, alcohol, or a combination thereof. The alcohol may include, e.g., ethanol, isopropyl alcohol, or a combination thereof.

In the mixing process, an amount of the carbon nanotubes may be about 0.01 wt % to about 0.1 wt % based on a total weight of a solid content of the mixture.

The drying process may be spray-drying.

The silicon-carbon composite may be commercially available one or prepared by the following process.

Micrometer-sized silicon particles and an organic solvent may be mixed to prepare a silicon dispersion. In an implementation, the mixing process may include a milling process, and the size of the silicon particles may be reduced from micrometers to nanometers to become nano-silicon. The milling process may be performed with a bead mill or a ball mill.

As the organic solvent, alcohols that do not oxidize the silicon particles and are easily volatilized may be appropriately used, and the alcohols may include, e.g., isopropyl alcohol, ethanol, methanol, butanol, propylene glycol, or a combination thereof.

A mixing (e.g., weight) ratio of the silicon particles and the organic solvent may be about 5:95 to about 30:70, or about 10:90 to about 25:75. If the mixing ratio of the silicon particles and the organic solvent is within the above ranges, milling efficiency may be further improved.

The obtained silicon dispersion may be spray-dried to prepare a Si precursor. The spray drying process may be carried out at about 50° C. to about 200° C. According to the spray drying process, primary particles of nano-silicon may be agglomerated to form secondary silicon particles. If the spray drying process is performed in the above temperature range, a process in which primary particles are agglomerated to form secondary particles may be more appropriately performed.

The Si precursor and the amorphous carbon precursor may be mixed.

A mixing (e.g., weight) ratio of the Si precursor and the amorphous carbon precursor may be about 80:20 to about 50:50. If the mixing ratio of the Si precursor and the amorphous carbon precursor is within the above range, the amorphous carbon may not be excessively included in the final negative active material, and a more appropriate silicon utilization rate may be obtained and excellent initial efficiency may be exhibited.

Examples of the amorphous carbon precursor may include coal pitch, meso-pitch, mesophase pitch, petroleum pitch, meso-carbon pitch, coal oil, petroleum heavy oil or a polymer resin such as phenol resin, furan resin, polyimide resin, or the like.

The obtained mixture may be subjected to heat treatment to prepare a heat-treated product.

The heat treatment process may be performed at about 700° C. to about 1,100° C. for about 1 hour to about 5 hours. During the heat treatment process, the amorphous carbon precursor may exist between the primary particles, which are silicon nanoparticles, present on the surface, to surround the surface of the secondary particle.

The heat treatment process may be performed under a $N_2$ atmosphere or an argon atmosphere. If the atmosphere of the heat treatment process is performed under the above conditions, it is possible to effectively form amorphous carbon while suppressing the oxidation of silicon and the generation of SiC, thereby reducing the resistance of the active material.

Some example embodiments provide a rechargeable lithium battery including a negative electrode, a positive electrode, and an electrolyte.

The negative electrode may include a current collector and a negative active material layer on the current collector and including the negative active material according to some example embodiments.

The negative active material according to some example embodiments may be included as a first negative active material, and crystalline carbon may be included as a second negative active material. A mixing (e.g., weight0 ratio of the first negative active material and the second negative active material may be about 1:99 to about 50:50. In an implementation, the negative active material may include the first negative active material and the second negative active material in a weight ratio of about 5:95 to about 20:80.

In the negative active material layer, an amount of the negative active material may be about 95 wt % to about 98 wt % based on a total weight of the negative active material layer.

In an implementation, the negative active material layer may include a binder or a conductive material. An amount of the binder may be about 1 wt % to about 5 wt % based on the total weight of the negative active material layer. An amount of the conductive material may be about 1 wt % to about 5 wt % based on the total weight of the negative active material layer.

The binder may facilitate attachment of the negative active material particles to each other and also attachment of the negative active material to the current collector. The binder may be, e.g., a non-aqueous binder, an aqueous binder, or a combination thereof.

The non-aqueous binder may include an ethylenepropylene copolymer, polyacrylonitrile, polystyrene, polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The aqueous binder may include a styrene-butadiene rubber (SBR), an acrylated styrene-butadiene rubber (ABR), an acrylonitrile-butadiene rubber, an acrylic rubber, a butyl rubber, a fluororubber, an ethylene oxide-containing polymer, polyvinyl pyrrolidone, polypropylene, polyepicrohydrin, polyphosphazene, an ethylene propylene diene copolymer, polyvinylpyridine, chlorosulfonated polyethylene, latex, a polyester resin, an acrylic resin, a phenolic resin, an epoxy resin, polyvinyl alcohol, or a combination thereof.

In an implementation, the aqueous binder may be used as the binder, and a cellulose compound may be further included to provide viscosity. The cellulose compound may include, e.g., carboxylmethyl cellulose, hydroxypropylmethyl cellulose, methyl cellulose, or alkali metal salts thereof. The alkali metal may be, e.g., Na, K, or Li. The cellulose compound may serve as a thickener or a binder. Accordingly, it is not necessary to separately limit the amount of the cellulose compound.

The conductive material may impart conductivity to the electrode, and a suitable material that does not cause a chemical change in the battery to be configured and is an electron conductive material may be used. Examples of the conductive material may include a carbon material such as natural graphite, artificial graphite, carbon black, acetylene black, Ketjen black, a carbon fiber, and the like; a metal material of a metal powder or a metal fiber including copper, nickel, aluminum, silver, and the like; a conductive polymer such as a polyphenylene derivative; or a mixture thereof.

The current collector may include a copper foil, a nickel foil, a stainless steel foil, a titanium foil, a nickel foam, a copper foam, a polymer substrate coated with a conductive metal, or a combination thereof.

The positive electrode may include a positive current collector and a positive active material layer on the positive current collector.

The positive active material may include lithiated intercalation compounds that reversibly intercalate and deintercalate lithium ions. In an implementation, one or more composite oxides of cobalt, manganese, nickel, or a combination thereof, and lithium may be used. In an implementation, a compound represented by any one of the following chemical formulas may be used. $Li_aA_{1-b}X_bD^1_2$ ($0.90 \le a \le 1.8$, $0 \le b \le 0.5$); $Li_aA_{1-b}X_bO_{2-c1}D^1_{c1}$ ($0.90 \le a \le 1.8$, $0 \le b \le 0.5$, $0 \le c1 \le 0.05$); $Li_aE_{1-b}X_bO_{2-c1}D^1_{c1}$ ($0.90 \le a \le 1.8$, $0 \le b \le 0.5$, $0 \le c1 \le 0.05$); $Li_aE_{2-b}X_bO_{4-c1}D^1_{c1}$ ($0.90 \le a \le 1.8$, $0 \le b \le 0.5$, $0 \le c1 \le 0.05$); $Li_aNi_{1-b-c}Co_bX_cD^1_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.5$, $0 \le \alpha \le 2$); $Li_aNi_{1-b-c}Mn_bXD^1_\alpha$ ($0.90 \le a \le 1.8$, $0 \le b \le 0.5$, $0 \le c \le 0.5$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.5$, $0 \le \alpha \le 2$); $Li_aNi_{1-b-c}Mn_bX_cO_{2-\alpha}T_2$ ($0.90 \le a \le 1.8$, $0 \le b \le 0.5$, $0 \le c \le 0.5$, $0 \le \alpha \le 2$); $Li_aNi_bE_cG_dO_2$ ($0.90 \le a \le 1.8$, $0 \le b \le 0.9$, $0 \le c \le 0.5$, $0.001 \le d \le 0.1$); $Li_aNi_bCo_cMn_dG_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG_bO_2$ ($0.90 \le a \le 1.8$, $0.001 \le b \le 0.1$) $Li_aCoG_bO_2$ ($0.90 \le a \le 1.8$, $0.001 \le b \le 0.1$); $Li_aMn_{1-b}G_bO_2$ ($0.90 \le a \le 1.8$, $0.001 \le b \le 0.1$); $Li_aMn_2G_bO_4$ ($0.90 \le a \le 1.8$, $0.001 \le b \le 0.1$); $Li_aMn_{1-g}G_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4Li_{(3-f)}J_2(PO_4)_3$ ($0 \le f \le 2$); $Li_{(3-f)}Fe_2(PO_4)_3$ ($0 \le f \le 2$); and $Li_aFePO_4$ ($0.90 \le a \le 1.8$)

In the above chemical formulas, A may be Ni, Co, Mn, or a combination thereof, X may be Al, Ni, Co, Mn, Cr, Fe, Mg, Sr, V, a rare earth element, or a combination thereof, $D^1$ may be 0, F, S, P, or a combination thereof, E may be Co, Mn, or a combination thereof, T may be F, S, P, or a combination thereof, G may be Al, Cr, Mn, Fe, Mg, La, Ce, Sr, V, or a combination thereof, Q may be Ti, Mo, Mn, or a combination thereof, Z may be Cr, V, Fe, Sc, Y, or a combination thereof, J may be V, Cr, Mn, Co, Ni, Cu, or a combination thereof, and $L^1$ may be Mn, Al, or a combination thereof.

The compounds may have a coating layer on the surface, or may be mixed with another compound having a coating layer. The coating layer may include a coating element compound, e.g., an oxide of a coating element, a hydroxide of a coating element, an oxyhydroxide of a coating element, an oxycarbonate of a coating element, or a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a positive active material by using these elements in the compound. In an implementation, the method may include a suitable coating method (e.g., spray coating, dipping, or the like).

In the positive electrode, an amount of the positive active material may be about 90 wt % to about 98 wt % based on the total weight of the positive active material layer.

In an implementation, the positive active material layer may further include a binder and a conductive material. The amounts of the binder and the conductive material may be about 1 wt % to about 5 wt %, respectively, based on a total weight of the positive active material layer.

The binder may facilitate attachment of the positive active material particles to each other and also to attachment of the positive active material to the current collector. Examples thereof may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may impart conductivity to the electrode, and a suitable that does not cause chemical change in the battery to be configured and is an electron conductive material may be used. Examples of the conductive material may include a carbon material such as natural graphite, artificial graphite, carbon black, acetylene black, Ketjen black, a carbon fiber, and the like; a metal material of a metal powder or a metal fiber including copper, nickel, aluminum, silver, and the like; a conductive polymer such as a polyphenylene derivative; or a mixture thereof.

The current collector may include Al.

The electrolyte solution may include a non-aqueous organic solvent and a lithium salt.

The non-aqueous organic solvent may serve as a medium for transmitting ions taking part in the electrochemical reaction of a battery.

The non-aqueous organic solvent may include a carbonate, ester, ether, ketone, alcohol, or aprotic solvent.

The carbonate solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester solvent may include methyl acetate, ethyl acetate, n-propyl acetate, dimethylacetate, methylpropionate, ethylpropionate, decanolide, mevalonolactone, caprolactone, or the like. The ether solvent may include dibutyl ether, tetraglyme, diglyme, dimethoxyethane, 2-methyltetrahydrofuran, or the like. The ketone solvent may include cyclohexanone or the like. The alcohol solvent may include ethanol, isopropyl alcohol, or the like. The aprotic solvent may include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, or the like.

The organic solvents may be used alone or in combination with one or more, and the mixing ratio if used in combination with one or more may be appropriately adjusted according to the desired battery performance.

In an implementation, the carbonate solvent may include a mixture of cyclic carbonate and chain carbonate. In an implementation, the cyclic carbonate and the chain carbonate may be mixed in a volume ratio of about 1:1 to about 1:9, and a performance of the electrolyte may be excellent.

In an implementation, the organic solvent may further include an aromatic hydrocarbon organic solvent in addition to the carbonate solvent. The carbonate solvent and the aromatic hydrocarbon organic solvent may be mixed in a volume ratio of about 1:1 to about 30:1.

The aromatic hydrocarbon organic solvent may be an aromatic hydrocarbon-based compound of Chemical Formula 1.

[Chemical Formula 1]

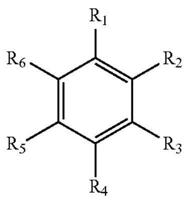

In Chemical Formula 1, $R_1$ to $R_6$ may each independently be or include, e.g., hydrogen, a halogen, a C1 to C10 alkyl group, a haloalkyl group, and a combination thereof.

Examples of the aromatic hydrocarbon organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include an additive, e.g., vinylethyl carbonate, vinylene carbonate or an ethylene carbonate compound of Chemical Formula 2 in order to improve a cycle-life of a battery.

[Chemical Formula 2]

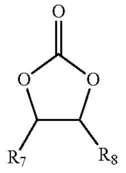

In Chemical Formula 2, $R_7$ and $R_8$ may each independently be or include, e.g., hydrogen, a halogen, a cyano group (CN), a nitro group ($NO_2$), and a fluorinated C1 to C5 alkyl group. In an implementation, at least one of $R_7$ and $R_8$ may be, e.g., a halogen, a cyano group (CN), a nitro group ($NO_2$), and a fluorinated C1 to C5 alkyl group, and $R_7$ and $R_8$ may not both be hydrogen.

Examples of the ethylene carbonate compound may include difluoro ethylenecarbonate, chloroethylene carbonate, dichloroethylene carbonate, bromoethylene carbonate, dibromoethylene carbonate, nitroethylene carbonate, cyanoethylene carbonate, and fluoroethylene carbonate. The amount of the additive for improving a cycle-life may be used within an appropriate range.

The lithium salt dissolved in an organic solvent may supply a battery with lithium ions, may basically operate the rechargeable lithium battery, and may help improve transportation of the lithium ions between positive and negative electrodes. Examples of the lithium salt may include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl) imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$, wherein, x and y are natural numbers, e.g., an integer ranging from 1 to 20, lithium difluoro(bisoxolato) phosphate, LiCl, LiI, $LiB(C_2O_4)_2$ (lithium bis(oxalato) borate: LiBOB), and lithium difluoro(oxalato)borate (LiDFOB). A concentration of the lithium salt may range from about 0.1 M to about 2.0 M. If the lithium salt is included at the above concentration range, an electrolyte may have excellent performance and lithium ion mobility due to optimal electrolyte conductivity and viscosity.

The rechargeable lithium battery may further include a separator between the negative electrode and the positive electrode, depending on a type of the battery. Examples of a suitable separator material may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

FIG. 1 is an exploded perspective view of a rechargeable lithium battery according to some example embodiments. As illustrated in the drawings, the rechargeable lithium battery may be a prismatic battery, or may include variously-shaped batteries such as a cylindrical battery, a pouch battery, or the like.

Referring to FIG. 1, a rechargeable lithium battery 100 according to some example embodiments may include an electrode assembly 40 manufactured by winding a separator 30 between a positive electrode 10 and a negative electrode 20, and a case 50 housing the electrode assembly 40. An electrolyte solution may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

An ethanol solvent and silicon particles having a particle size of several micrometers were mixed in a weight ratio of 9:1, and a silicon nano-dispersion was prepared using a bead mill (Netzsch, Germany).

The silicon nano-dispersion was spray-dried at 170° C. using a spray dryer to prepare a Si precursor.

The Si precursor and meso pitch were mixed in a weight ratio of 50:50, and the mixture was heat-treated at 900° C. for 2 hours under a $N_2$ atmosphere to prepare a silicon-carbon composite. This silicon-carbon composite was in the form of secondary particles (an agglomerated product in which nano-silicon particles were agglomerated and a soft carbon coating layer on the surface of the agglomerated product). An amount of the silicon nano particles was 50 wt %, and an amount of the amorphous carbon was 50 wt %.

The silicon-carbon composite was mixed with urea in a weight ratio of 99:1 and then, heat-treated at 650° C. under a $N_2$ atmosphere for 5 hours. In this heat treatment process, the urea was decomposed, forming an N-doped carbon layer on the surface of the silicon-carbon composite.

Subsequently, the obtained product was mixed with single-walled carbon nanotubes (SWCNT) in a weight ratio 99.9:0.1 in water, and this mixture was spray-dried, preparing a negative active material having the silicon-carbon composite, N-doped carbon layer on the composite surface, and a carbon nanotube coating layer on the carbon layer.

97.5 wt % of the prepared negative active material, 1 wt % of carboxymethyl cellulose, and 0.5 wt % of a styrene butadiene rubber were mixed in a water solvent, preparing negative active material layer slurry.

The negative active material layer slurry was coated on a Cu foil current collector and then, dried and pressed, forming a negative active material layer and thereby, preparing a negative electrode having an active mass density of 1.1 g/cc.

The negative electrode, a lithium metal counter electrode, and an electrolyte were used to manufacture a half-cell. The electrolyte was prepared by forming a 1 M $LiPF_6$ solution in a mixed solvent of ethylene carbonate and dimethyl carbonate (in a volume ratio of 3:7).

Example 2

A negative active material was prepared in the same manner as in Example 1 except that the silicon-carbon composite was mixed with urea in a weight ratio of 98:2.

The negative active material was used in the same manner as in Example 1, manufacturing a negative electrode having an active mass density of 1.1 g/cc and a half-cell.

Example 3

A negative active material was prepared in the same manner as in Example 1 except that the silicon-carbon composite was mixed with urea in a weight ratio of 95:5.

The negative active material was used in the same manner as in Example 1, manufacturing a negative electrode having an active mass density of 1.1 g/cc and a half-cell.

Example 4

A negative active material was prepared in the same manner as in Example 1 except that melamine was used instead of the urea.

The negative active material was used in the same manner as in Example 1, manufacturing a negative electrode having an active mass density of 1.1 g/cc and a half-cell.

Example 5

A negative active material was prepared in the same manner as in Example 1 except that multi-walled carbon nanotubes (MWCNT) were used instead of the single-walled carbon nanotubes.

The negative active material was used in the same manner as in Example 1, manufacturing a negative electrode having an active mass density of 1.1 g/cc and a half-cell.

Example 6

A negative active material was prepared in the same manner as in Example 4 except that multi-walled carbon nanotubes (MWCNT) were used instead of the single-walled carbon nanotubes.

The negative active material was used in the same manner as in Example 1, manufacturing a negative electrode having an active mass density of 1.1 g/cc and a half-cell.

Comparative Example 1

A negative electrode having an active mass density of 1.1 g/cc and a half-cell were manufactured in the same manner as in Example 1 except that the silicon-carbon composite of Example 1 (e.g., without mixing with urea and heat treating) was used as a negative active material.

Comparative Example 2

A negative electrode having an active mass density of 1.1 g/cc and a half-cell were manufactured in the same manner as in Example 1 except that a negative active material was prepared by forming an N-doped carbon layer on the surface of the silicon-carbon composite prepared in Example 4.

Comparative Example 3

A negative electrode having an active mass density of 1.1 g/cc and a half-cell were manufactured in the same manner as in Example 1 except that the silicon-carbon composite of Example 1 was mixed with single-walled carbon nanotubes in a weight ratio of 99.9:0.1 in water, and this mixture was spray-dried to prepare a negative active material having the silicon-carbon composite and a carbon nanotube coating layer on the silicon-carbon composite.

The negative active material was used in the same manner as in Example 1, manufacturing a negative electrode having active mass density of 1.1 g/cc and a half-cell.

Comparative Example 4

The Si precursor prepared according to Example 1, meso pitch, and single-walled carbon nanotubes were mixed in a weight ratio of 98.95:1:0.05, and this mixture was heat-treated at 900° C. under an $N_2$ atmosphere for 2 hours, manufacturing a silicon-carbon-carbon nanotube composite.

The silicon-carbon-carbon nanotube composite and urea were mixed in a weight ratio of 99:1 and then, heat-treated at 650° C. under an $N_2$ atmosphere for 5 hours. In this heat treatment process, melamine was decomposed, forming an N-doped carbon layer on the composite surface.

Subsequently, the obtained product and single-walled carbon nanotubes were mixed in a weight ratio of 99.9:0.1 in water, and this mixture was spray-dried, preparing a negative active material having the silicon-carbon-carbon nanotube composite, an N-doped carbon layer on the composite surface, and a carbon nanotube coating layer on the carbon layer.

The negative active material was used in the same manner as in Example 1, manufacturing a negative electrode having an active mass density of 1.1 g/cc and a half-cell.

Table 1 shows N-containing compounds and types of carbon nanotubes used in Example 1 to 5 and the Comparative Examples 1 to 4 and also, in each of the negative active material thereof, an amount of an N-doped carbon layer, a thickness of the N-doped carbon layer, an amount of carbon nanotube coating layer, and a thickness of the carbon nanotube coating layer. As for Comparative Example 4 (in which a composite corresponding to a core included carbon nanotubes), a total carbon nanotube amount of the carbon nanotubes included in the composite and carbon nanotubes included in a coating layer is shown in Table 1.

TABLE 1

| | N-containing compound | Amount of N-doped carbon layer (wt %) | Thickness of N-doped carbon layer (nm) | Type of carbon nanotube | Amount of carbon nanotube coating layer (wt %) | Thickness of carbon nanotube coating layer (nm) |
|---|---|---|---|---|---|---|
| Example 1 | urea | 1 | 100-400 | SWCNT | 0.1 | 100-500 |
| Example 2 | urea | 2 | 100-400 | SWCNT | 0.1 | 100-500 |
| Example 3 | urea | 5 | 100-400 | SWCNT | 0.1 | 100-500 |
| Example 4 | melamine | 1 | 100-400 | SWCNT | 0.1 | 100-500 |
| Example 5 | urea | 1 | 100-400 | MWCNT | 0.1 | 100-500 |
| Example 6 | melamine | 1 | 100-400 | MWCNT | 0.1 | 100-500 |
| Comparative Example 1 | none | none | | none | none | |
| Comparative Example 2 | melamine | 1 | 100-400 | none | none | |
| Comparative Example 3 | none | none | | SWCNT | 0.1 | 100-500 |
| Comparative Example 4 | urea | 1 | 100-400 | SWCNT | 1.05 | 100-500 |

Experimental Example 1) SEM Evaluation

Figure 2:
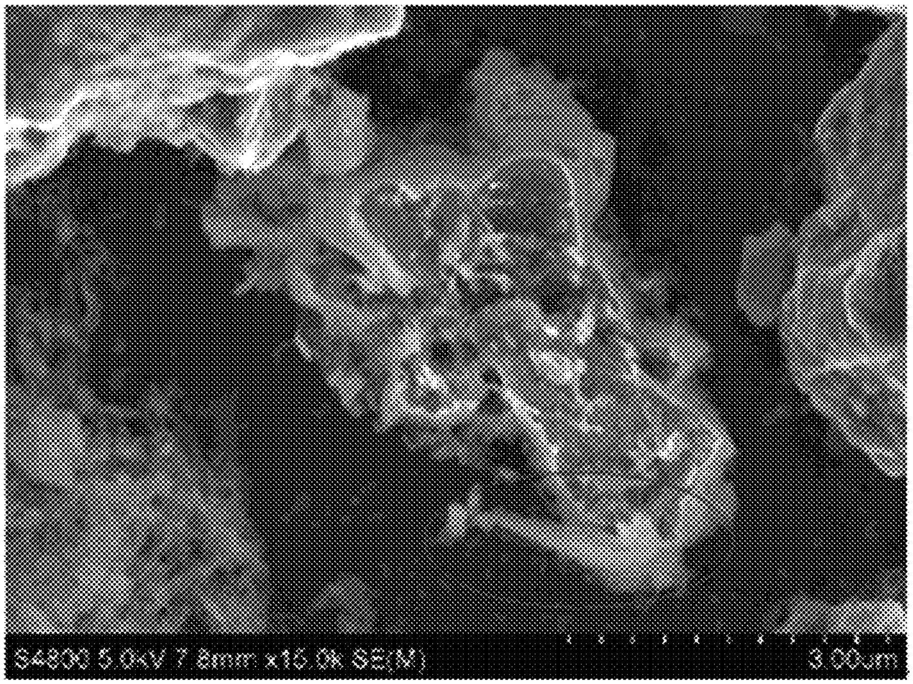
FIG. 2 is a SEM image of the negative active material prepared in Example 1.

An SEM image of the negative active material of Example 1 was taken, and is shown in FIG. 2.

As shown in FIG. 2, the negative active material according to Example 1 had a sponge shape and included a sheet shape (a circled portion).

Experimental Example 2) Resistance Evaluation

Each of the negative electrodes having an active mass density 1.1 g/cc according to Example 1 and Comparative Example 1 was measured with respect to powder resistance in an electrical conductivity measurement method, and the results are shown in Table 2.

TABLE 2

| | Powder resistance (Ωcm) |
|---|---|
| Comparative Example 1 | 1.8 |
| Example 1 | 1.2 |

As shown in Table 2, the negative electrode of Example 1 exhibited about 35% reduced resistance, compared with the negative electrode of Comparative Example 1.

Experimental Example 3) Evaluation of Specific Capacity

Each of the half-cells according to Examples 1 to 6 and Comparative Examples 1 to 4 were charged once and discharged at 0.1 C and measured with respect to charge and discharge capacity. The measured discharge capacity is shown as specific capacity in Table 3. A ratio of the discharge capacity to the charge capacity was calculated, and the results are shown as efficiency in Table 3.

Experimental Example 4) Evaluation of High Rate Capability

Each of the half-cells according to Examples 1 to 6 and Comparative Examples 1 to 4 was charged once and discharged at 0.2 C and charged once and discharged at 2 C. A ratio of 2 C charge capacity to 0.2 C charge capacity was calculated, and the results are shown as a charging ratio in Table 3.

Experimental Example 5) Evaluation of Cycle-life Characteristics

Each of the half-cells of Examples 1 to 6 and Comparative Examples 1 to 4 was charged 350 times and discharged at 1 C. A ratio of the $350^{th}$ discharge capacity to the $1^{st}$ discharge capacity was calculated, and the results are shown as a cycle-life (%) in Table 3.

TABLE 3

| | Specific capacity (mAh/g) | Efficiency (%) | Charge ratio (%) | Cycle-life (%) |
|---|---|---|---|---|
| Example 1 | 1438 | 84.0 | 47 | 88 |
| Example 2 | 1430 | 84.6 | 43 | 82 |

TABLE 3-continued

| | Specific capacity (mAh/g) | Efficiency (%) | Charge ratio (%) | Cycle-life (%) |
|---|---|---|---|---|
| Example 3 | 1400 | 85.5 | 44 | 84 |
| Example 4 | 1433 | 83.7 | 45 | 85 |
| Example 5 | 1439 | 84.1 | 44 | 82 |
| Example 6 | 1435 | 84.0 | 45 | 81 |
| Comparative Example 1 | 1450 | 83.2 | 32 | 78 |
| Comparative Example 2 | 1440 | 83.9 | 38 | 81 |
| Comparative Example 3 | 1450 | 83.2 | 40 | 84 |
| Comparative Example 4 | 1433 | 83.9 | 49 | 75 |

As shown in Table 3, the cells using a negative active material having an N-doped carbon layer and a coating layer including carbon nanotubes according to Examples 1 to 6 exhibited excellent capacity, efficiency, charging ratio, and cycle-life characteristics.

On the contrary, the cell of Comparative Example 1 (using a negative active material including neither N-doped carbon layer nor carbon nanotubes) exhibited a very low charging ratio and significantly lower cycle-life characteristics.

The cell of Comparative Example 2 (including a N-doped carbon layer but no carbon nanotube coating layer) exhibited deteriorated efficiency and charging rate. The cell of Comparative Example 3 (using a negative active material including a carbon nanotube coating layer but no N-doped carbon layer) exhibited a little deteriorated efficiency and charging rate.

The cell of Comparative Example 4 (using a negative active material including an N-doped carbon layer and a coating layer including carbon nanotubes but also, including the carbon nanotubes in a core) exhibited an excellent charging rate but deteriorated conductivity and thus significantly low cycle-life.

Based on the results, in Comparative Examples 1 to 4, capacity, efficiency, charging rate, and cycle-life characteristics were not all satisfactory.

By way of summation and review, crystalline carbon, e.g., graphite, may be used as a negative active material of a rechargeable lithium battery. A capacity of the graphite may be as low as 360 mAh/g, and a silicon active material having a capacity four times higher has been considered.

One or more embodiments may provide a negative active material exhibiting excellent cycle-life characteristics and rate capability.

Example embodiments have been disclosed herein, and although specific terms are employed, they are used and are to be interpreted in a generic and descriptive sense only and not for purposes of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material, comprising:

a silicon-carbon composite comprising nano-silicon and amorphous carbon;

an N-doped carbon layer on the silicon-carbon composite; and a coating layer on the N-doped carbon layer, the coating layer comprising carbon nanotubes, wherein the N-doped carbon layer has a sponge structure.

2. The negative active material as claimed in claim 1, wherein the carbon nanotubes comprise single-walled carbon nanotubes, multi-walled carbon nanotubes, or a combination thereof.

3. The negative active material as claimed in claim 1, wherein the carbon nanotubes are single-walled carbon nanotubes.

4. The negative active material as claimed in claim 1, wherein the N-doped carbon layer has a sheet shape.

5. The negative active material as claimed in claim 1, wherein the silicon-carbon composite further comprises crystalline carbon.

6. The negative active material as claimed in claim 1, wherein the N-doped carbon layer is comprised in an amount of about 1 wt % to about 7 wt %, based on a total weight of the negative active material.

7. The negative active material as claimed in claim 1, wherein the carbon nanotubes are comprised in an amount of about 0.01 wt % to about 0.15 wt %, based on a total weight of the negative active material.

8. The negative active material as claimed in claim 1, wherein the N-doped carbon layer is prepared from urea, melamine, thiourea, ethylenediamine, or a combination thereof.

9. The negative active material as claimed in claim 1, wherein the N-doped carbon layer has a thickness of about 100 nm to about 500 nm.

10. The negative active material as claimed in claim 1, wherein the coating layer comprising the carbon nanotubes has a thickness of about 100 nm to about 500 nm.

11. A rechargeable lithium battery, comprising:

a negative electrode including a negative active material of claim 1;

a positive electrode; and an electrolyte.

12. The negative active material as claimed in claim 1, wherein the N-doped carbon layer is directly between the silicon-carbon composite and the coating layer.

* * * * *